July 11, 1933. C. W. LANHAM 1,917,654
CORN PLANTER
Filed Jan. 23, 1932 2 Sheets-Sheet 2
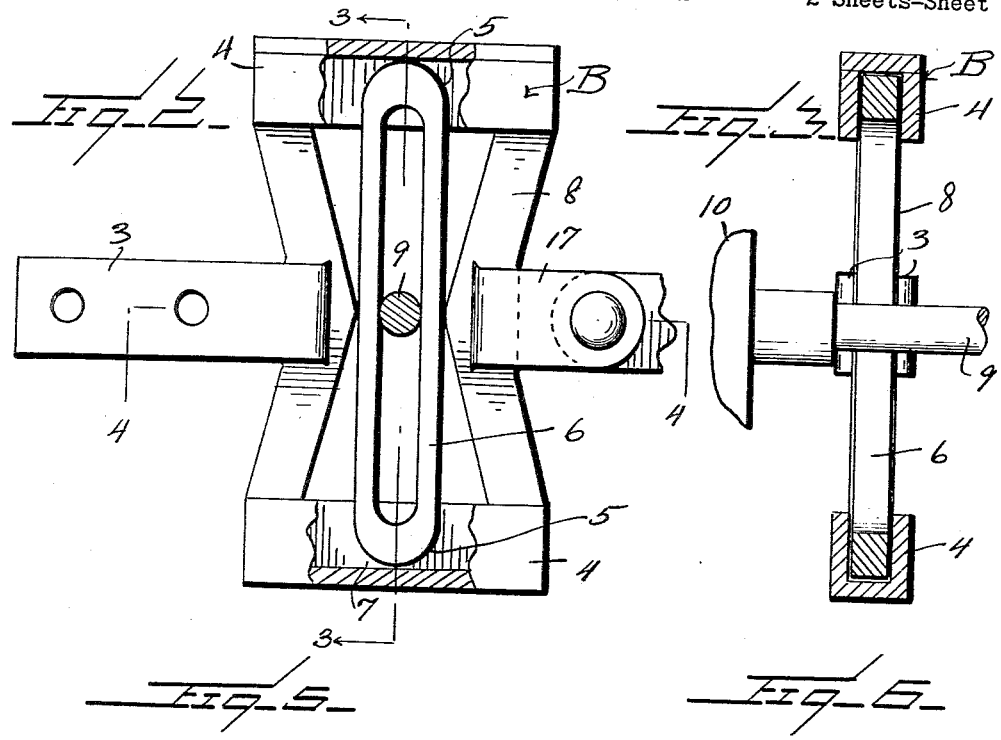
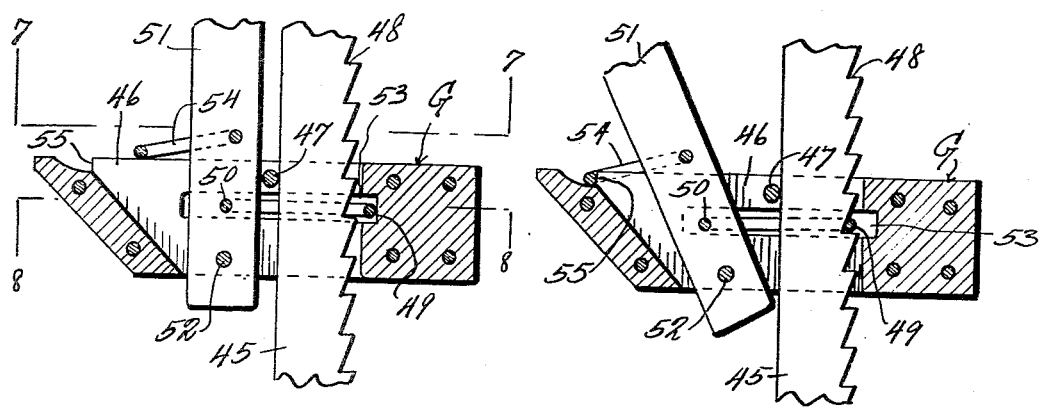
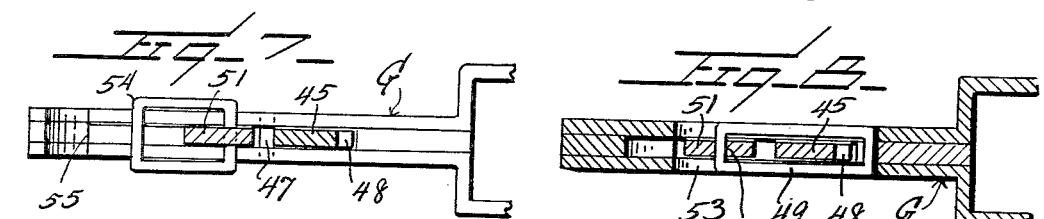
Inventor
C. W. Lanham
By Watson E. Coleman
Attorney Patented July 11, 1933

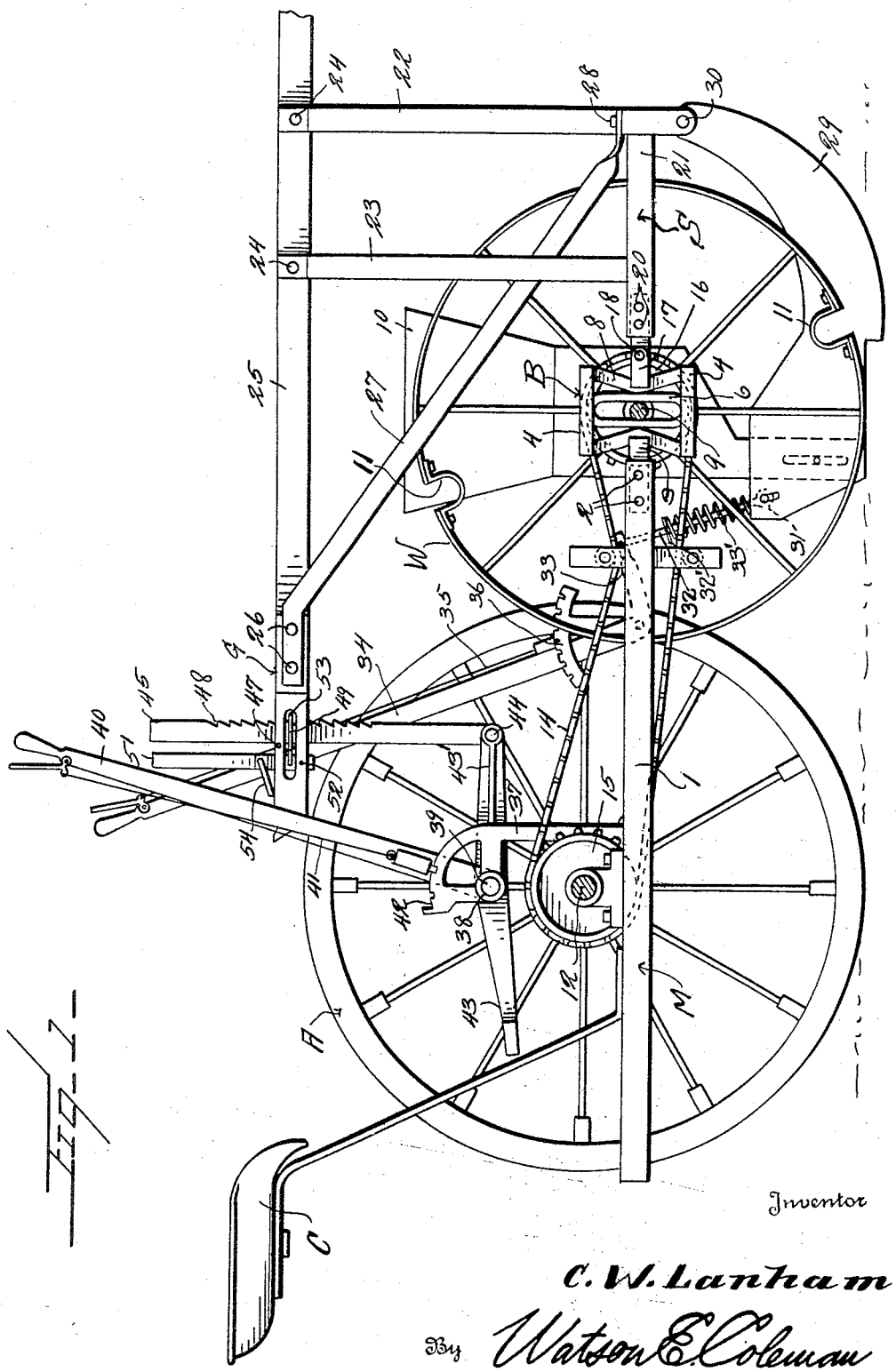

1,917,654

UNITED STATES PATENT OFFICE

COLONEL W. LANHAM, OF CHICAGO, ILLINOIS

CORN PLANTER

Application filed January 23, 1932. Serial No. 588,404.

This invention relates to a corn planter and particularly of the type embodying the use of a marking wheel, and it is an object of the invention to provide means for mounting the marking wheel in a manner to effectively maintain the same in proper connection with its driver irrespective of any rise and fall of said marking wheel as may particularly occur as a result of irregularities in the surface over which the wheel is traversing.

It is also an object of the invention to provide a planter of this kind wherein a furrow opener or the like is carried by a frame normally intended to have free swinging movement in a vertical direction to allow the furrow opener to be raised to place the same in an inoperative position when the use of the furrow opener is not desired or making a turn at the end of a row.

The invention consists in the details of construction and in the combination and arrangement of the several parts of my improved corn planter whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in side elevation with parts in section of a corn planter constructed in accordance with an embodiment of my invention;

Figure 2 is an enlarged fragmentary view partly in elevation and partly in section illustrating one of the bearings as herein comprised for coaction with the shaft of the seed dropping mechanism;

Figure 3 is a detailed sectional view taken substantially on the line 3—3 of Figure 2;

Figure 4 is a detailed sectional view taken substantially on the line 4—4 of Figure 2;

Figure 5 is a fragmentary view partly in section and partly in elevation of a portion of the means for raising and lowering the front or auxiliary frame of the planter;

Figure 6 is a view similar to Figure 5 but showing certain of the parts in a second position;

Figure 7 is a detailed sectional view taken substantially on the line 7—7 of Figure 5;

Figure 8 is a detailed sectional view taken substantially on the line 8—8 of Figure 5.

As disclosed in the accompanying drawings, the main frame M of the machine is of a conventional yoke type with the forward extremity of each of the side arms or members 1 of the frame having secured thereto, as at 2, an extremity of an arm 3. The opposite or outer end portion of this arm 3 is formed with or otherwise rigidly connected to a vertically disposed bearing member B. This member B constitutes a frame having the opposed faces of its upper and lower members 4 grooved or channeled, as at 5, to receive the opposite end portions of an elongated rigid link member 6. The extremities of the member 6 are rounded, as at 7, to allow the same to have ready rocking or swinging movement.

The side members 8 of the bearing member B are substantially V-shaped in form with their apices midway between the end members 4 and spaced apart a distance substantially equal to the maximum width of the central portion of the link member 6 so that said link member 6 is maintained in desired position for required rocking or swinging movement. The extent of the swinging or rocking movement of the link member 6 is limited by contact with the inner edges of the side members 8 above and below their apices.

Disposed through each of the link members 6 is an end portion of a shaft 9 the adjacent end of the shaft outwardly of the member B being associated with a seed dropping mechanism (not shown) associated with a hopper 10. The seed dropping mechanism may be of any character desired as for example similar to the mechanism shown in my Patent #1,304,992 dated May 27, 1919.

The corn dropping mechanism in the actual machine is duplicated at opposite ends of the shaft 9 but insofar as the present invention is concerned it is not believed necessary to have any description or illustration of such duplication.

The shaft 9 carries and has rotating therewith a marking wheel W which, as herein disclosed, comprises the notches 11 as the marking elements. The frame M rotatably supports a transversely disposed shaft 12 which carries the main supporting and furrow closing wheel one of which A being illustrated in Figure 1 of the drawings. The shaft 12 is in driving connection with the shaft 9, as herein disclosed, by a sprocket chain 14 engaging the sprocket wheels 15 and 16 fixed to the shafts 12 and 9 respectively.

In operation, as the marking wheel W rises and falls due to the irregularities of any kind in the ground surface, the link member 6 at each side of the machine will rock in a direction to assure the desired effective maintenance of the drive connection between these shafts 12 and 9 and more especially eliminating any undue slackening or tightening of the chain 14 as a result of such rise and fall of the wheel W and, of course, its associated shaft 9.

The forward side member 8 of each of the bearing members B at its central part is provided with forwardly directed spaced ears 17 between which are pivotally connected, as at 18, an end portion of a bar 19 anchored, as at 20, to the inner end portion of a side member 21 of a front or supplemental frame S whereby said frame S is supported for swinging movement in a vertical direction.

The frame S carries the upstanding arched members 22 and 23, the upper central portions of which are suitably secured, as at 24, with the rear portion of the tongue 25 of the machine. The tongue 25 rearwardly of the arched members 22 and 23 at each side thereof has engaged therewith, as at 26, an end portion of a brace member 27 which extends downwardly and forwardly and has its opposite end portion secured, as at 28, to a forward side portion of the frame S.

Coacting in a conventional manner with each of the hoppers 10 is a furrow opener 29 pivotally connected at its forward end, as at 30, with the frame S. Operatively connected, as at 31, with the rear portion of the furrow opener 29 is an upstanding link or rod 32 which is also in operative connection with the forward end portion of a rock lever 33 carried by the lower pivoted end portion of the upstanding hand lever 34 whereby upon proper manipulation of the lever 34 the degree of penetration of the furrow opener 29 may be regulated. The lever 34 carries a conventional latch mechanism 35 for coaction with the rack 36 mounted upon the frame M. Surrounding the link or rod 32 is a coil spring 33′ interposed between a washer 32′ fixed to the link or rod 32 and the adjacent portion of the furrow opener 29 whereby the furrow opener is yieldingly pressed downwardly against the ground.

The frame M also carries an upstanding bracket 37 providing a bearing 38 for a rock shaft 39. Engaged with the shaft 39 is the lower portion of a hand lever 40 carrying a latch mechanism 41 for coaction with the rack 42 at the upper portion of the bracket 37. The shaft 39 also has fixed thereto a rearwardly directed foot lever or pedal 43 readily accessible to an occupant of the seat structure C as are also the hand levers 34 and 40 hereinbefore referred to.

The shaft 39 is also provided with a forwardly directed rock arm 43′, the outer end portion of which is pivotally connected, as at 44, with the lower portion of a vertically disposed bar 45. The upper portion of this bar 45 is freely disposed through an opening 46 in a guide member G held to the rear end portion of the machine tongue 25 by the connections 26 hereinbefore referred to. The upper portion of the slot 46 is intersected by a pin 47 for contact with the rear edge of the bar 45 to limit the movement of said bar 45 in a direction away from the forward end of the opening 46 so that the bar 45 will have movement through the guide member G in substantially a fixed path, yet allowing said bar 45 to have necessary swinging or oscillating movement as the requirements of practice may necessitate to assure the desired movement of the bar 45. The forward marginal portion of the bar 45 is provided therealong with a series of upwardly facing ratchet teeth 48 with each of which is adapted to be engaged a loop latch 49 surrounding the member 45 and having pivotal or swinging connection, as at 50, with a locking lever 51. This locking member 51 extends from above within the opening 46 and is pivotally held to the member G by the pivot pin 52 intersecting the opening 46 and carried by the member G. The side walls of the opening 46 are provided with the longitudinally disposed slots 53 to allow for the desired placement of the loop latch 49 and also serving as a guiding means for said loop latch 49 to assure its maintenance at all times in effective position with respect to the bar 45.

As is clearly illustrated in Figure 8 the side members of the loop latch 49 are received within the slots 53 but, as illustrated in Figures 5 and 6, each of these slots 53 is of sufficient width to allow the loop latch 49 to have the necessary swinging movement with respect to the lever 51.

When the lever 51 is at the limit of its forward movement, as illustrated in Figure 5 and as determined by the contact of said lever with the pin 47, the loop latch 49 is entirely free of the bar 45 so that said bar 45 will offer no hinderance or obstruction to any swinging movement of the frame S in a vertical direction due to irregularities with which a furrow opener 29 may come into contact. However, when it is desired to effect a raising of the furrow opening 29, as at the end of a row to facilitate a turning, the lock lever 51 is drawn rearwardly as indicated in Figure 6 resulting in the loop latch 49 engaging a tooth 48.

At this time it is to be particularly noted that the desired locking of the bar 45 to the rear portion of the machine tongue 25 may be effected irrespective of the varying positions of the furrow opener 29. With the bar 45 locked to the tongue 25 pull may be imposed upon the lever 40 or pressure upon the foot lever or pedal 43 or both whereupon the rear portion of the machine tongue 25 may be raised resulting in a lifting of the frame S and the furrow opener 29, it being taken into consideration of course that the connection of the outer portion of the machine tongue 25 with the draft animals constitutes a fulcrum upon which such swinging movement of the tongue 25 is effected.

As the lever 51 is swung rearwardly to engage the loop latch 49 with the bar 45, a second loop latch 54 pivotally engaged with and rearwardly extending from the lever 51 has engagement with a locking shoulder 55 provided in the upper rear portion of the member G.

From the foregoing description it is thought to be obvious that a corn planter constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A corn planter comprising, in combination, a main frame, a seed dropping mechanism carried thereby, a front supplemental frame pivotally connected with the main frame, for swinging movement in a vertical direction, a machine tongue carried by the supplemental frame, said tongue having a vertically disposed opening, a rock arm carried by the main frame, means for operating the rock arm, a toothed bar pivotally connected to the rock arm and freely extending through the opening in the tongue, a lever carried by the tongue, and means operated by said lever for selectively engaging the teeth of the bar for locking said bar to the tongue and against endwise movement independently thereof.

2. A corn planter comprising, in combination, a main frame, a seed dropping mechanism carried thereby, a front supplemental frame pivotally connected with the main frame for swinging movement in a vertical direction, a machine tongue carried by the supplemental frame, said tongue having a vertically disposed opening, a rock arm carried by the main frame, means for operating the rock arm, a toothed bar pivotally connected to the rock arm and freely extending through the opening in the tongue, a lever carried by the tongue, means operated by said lever for selectively engaging the teeth of the bar for locking said bar to the tongue and against endwise movement independently thereof, and means for locking the lever of the tongue when in position for locking the bar to the tongue.

In testimony whereof I hereunto affix my signature.

COLONEL W. LANHAM.